H. C. H. COOPER.
VOTING MACHINE.
APPLICATION FILED MAY 29, 1896.

995,326.

Patented June 13, 1911.

7 SHEETS—SHEET 1.

H. C. H. COOPER.
VOTING MACHINE.
APPLICATION FILED MAY 29, 1896.
995,326.
Patented June 13, 1911.
7 SHEETS—SHEET 2.
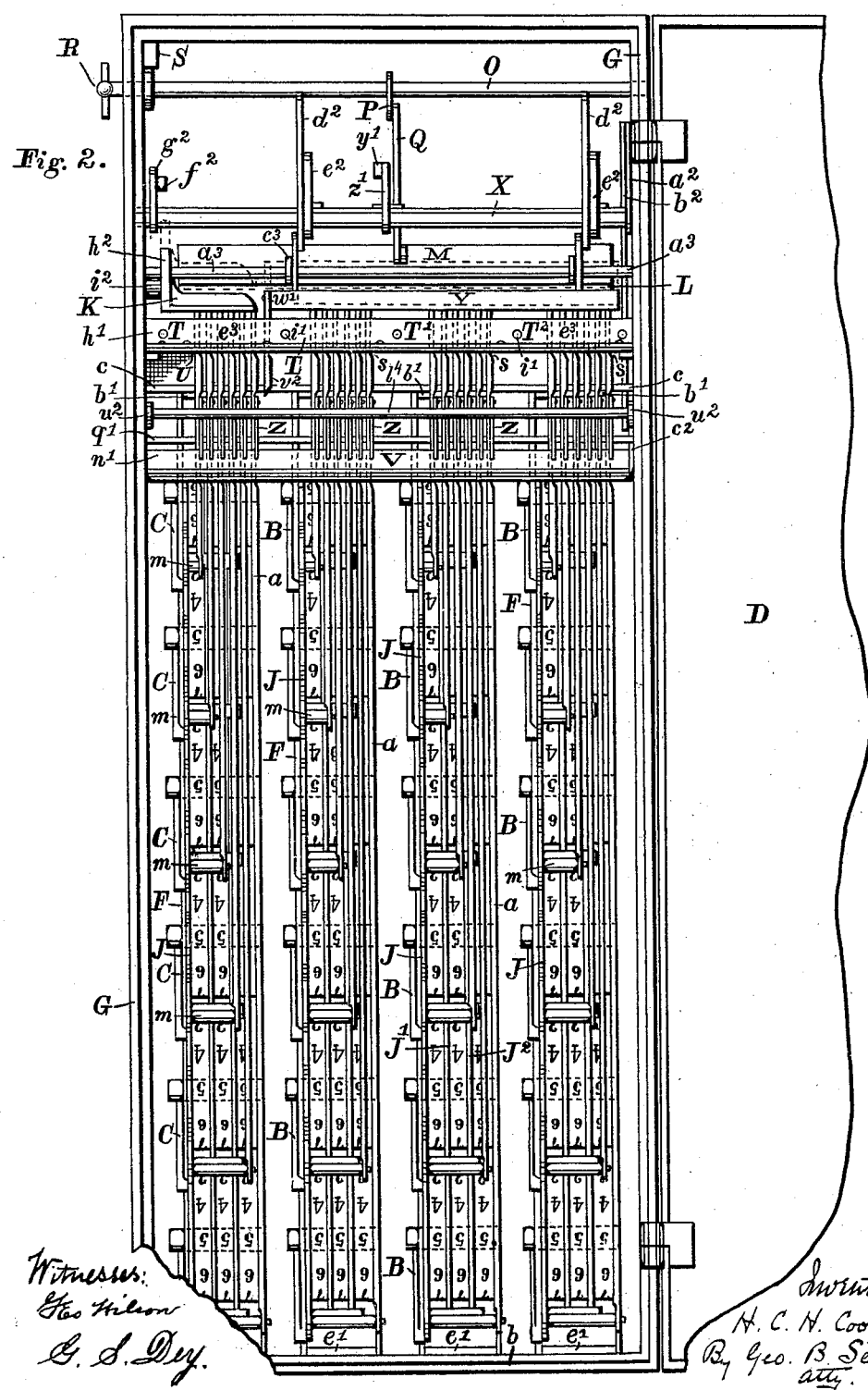

H. C. H. COOPER.
VOTING MACHINE.
APPLICATION FILED MAY 29, 1896.
995,326.
Patented June 13, 1911.
7 SHEETS—SHEET 3.
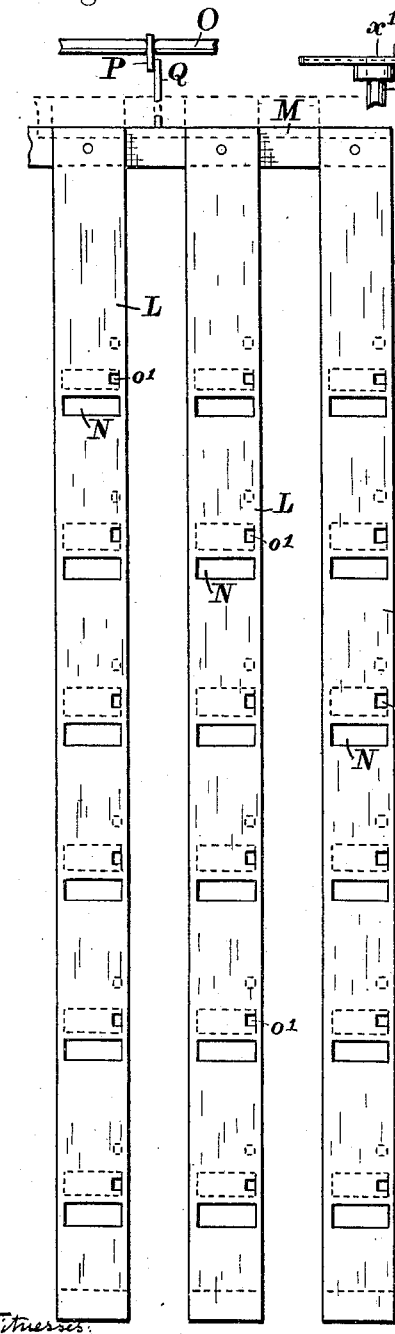
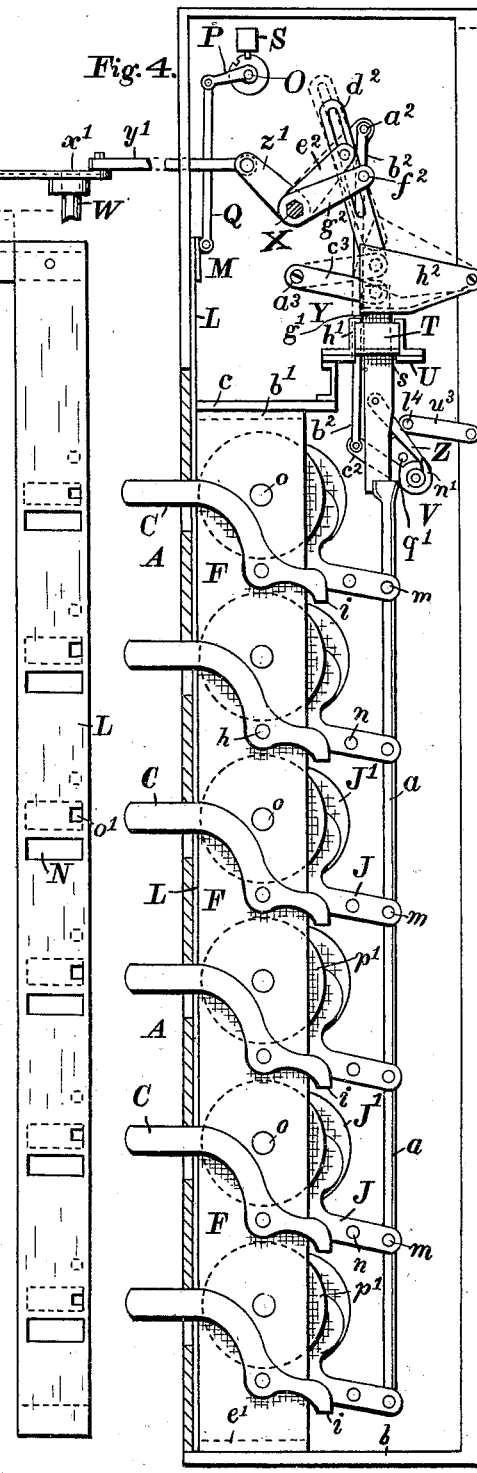
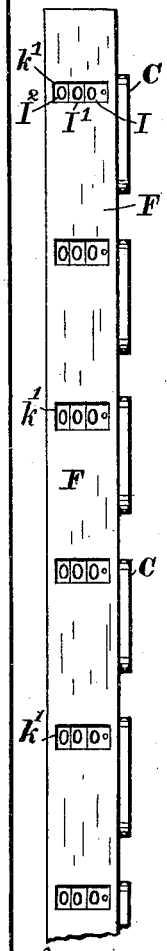

H. C. H. COOPER.
VOTING MACHINE.
APPLICATION FILED MAY 29, 1896.
995,326.
Patented June 13, 1911.
7 SHEETS—SHEET 4.
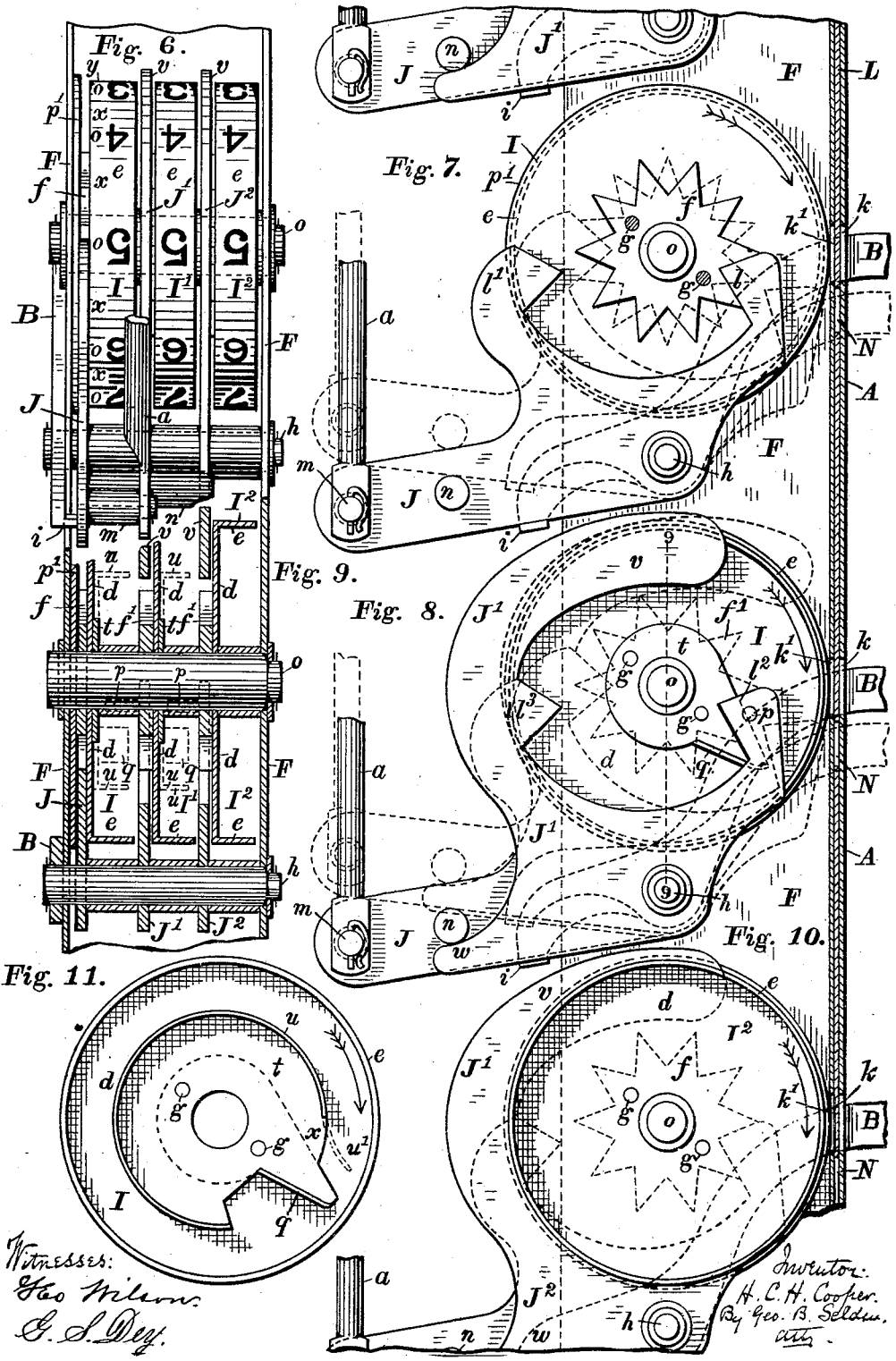

H. C. H. COOPER.
VOTING MACHINE.
APPLICATION FILED MAY 29, 1896.

995,326.

Patented June 13, 1911.

7 SHEETS—SHEET 5.

Witnesses:
Geo Wilson
G. S. Dey

Inventor:
H. C. H. Cooper,
By Geo. B. Selden,
Atty.

H. C. H. COOPER.
VOTING MACHINE.
APPLICATION FILED MAY 29, 1896.
995,326.
Patented June 13, 1911.
7 SHEETS—SHEET 6.
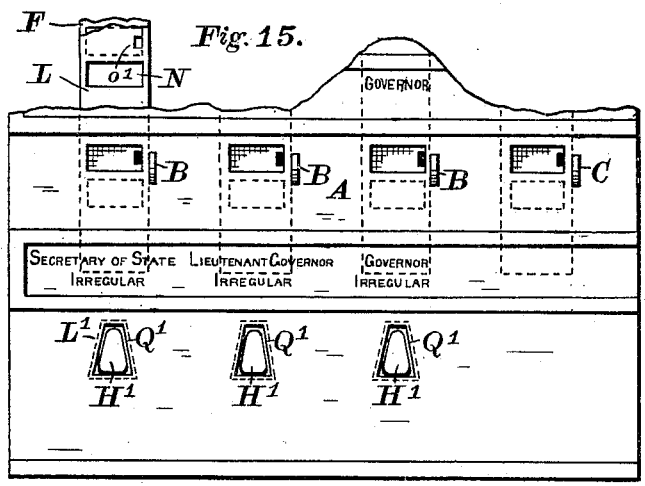
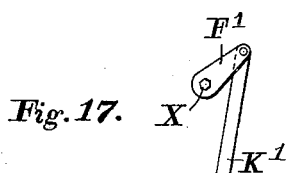
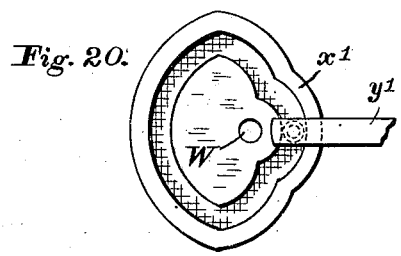
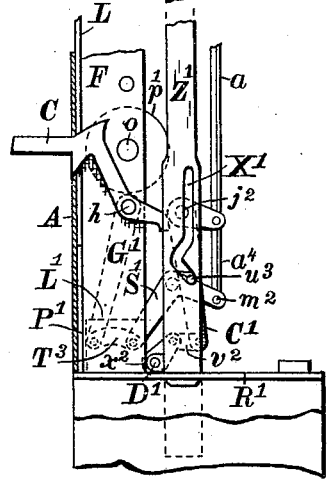
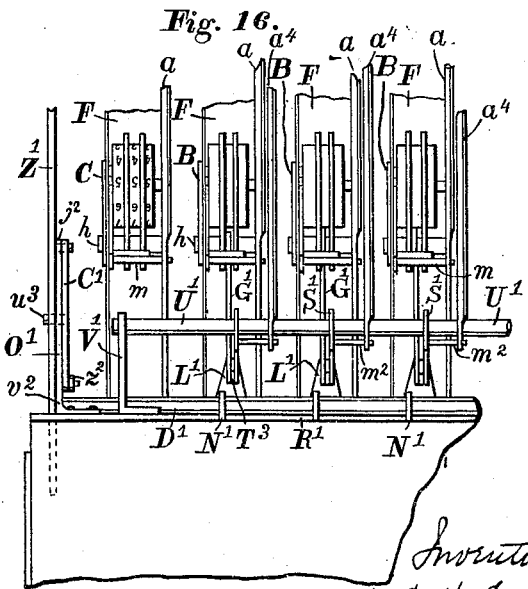

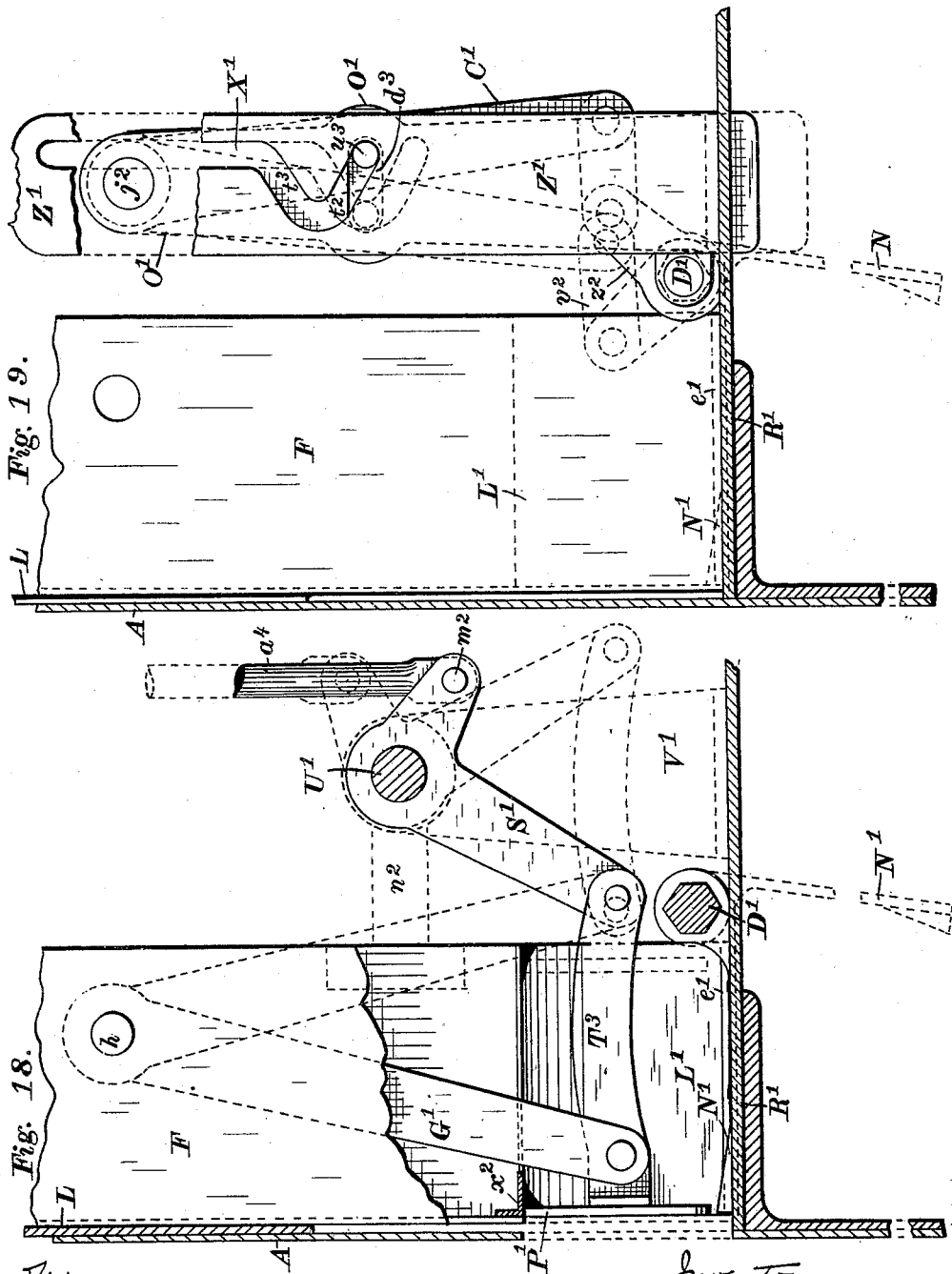

UNITED STATES PATENT OFFICE.

HENRY C. H. COOPER, OF JAMESTOWN, NEW YORK, ASSIGNOR, BY MESNE ASSIGNMENTS, TO EMPIRE VOTING MACHINE COMPANY, OF ROCHESTER, NEW YORK, A CORPORATION OF NEW YORK.

VOTING-MACHINE.

995,326.      Specification of Letters Patent.      Patented June 13, 1911.

Application filed May 29, 1896. Serial No. 593,558.

*To all whom it may concern:*

Be it known that I, HENRY C. H. COOPER, a citizen of the United States, residing at Jamestown, in the county of Chautauqua, in the State of New York, have invented certain Improvements in Voting-Machines, of which the following is a specification, reference being had to the accompanying drawings.

My invention relates to improvements in voting machines,—designed more particularly for use on that type of positive-acting voting-machines which was first shown in Patent No. 526,668, issued Sept. 25, 1894, to S. E. Davis, but capable of use in other relations.

My improvements are fully described and illustrated in the following specification and the accompanying drawings, the novel features thereof being specified in the claims annexed to the said specification.

Figure 1:
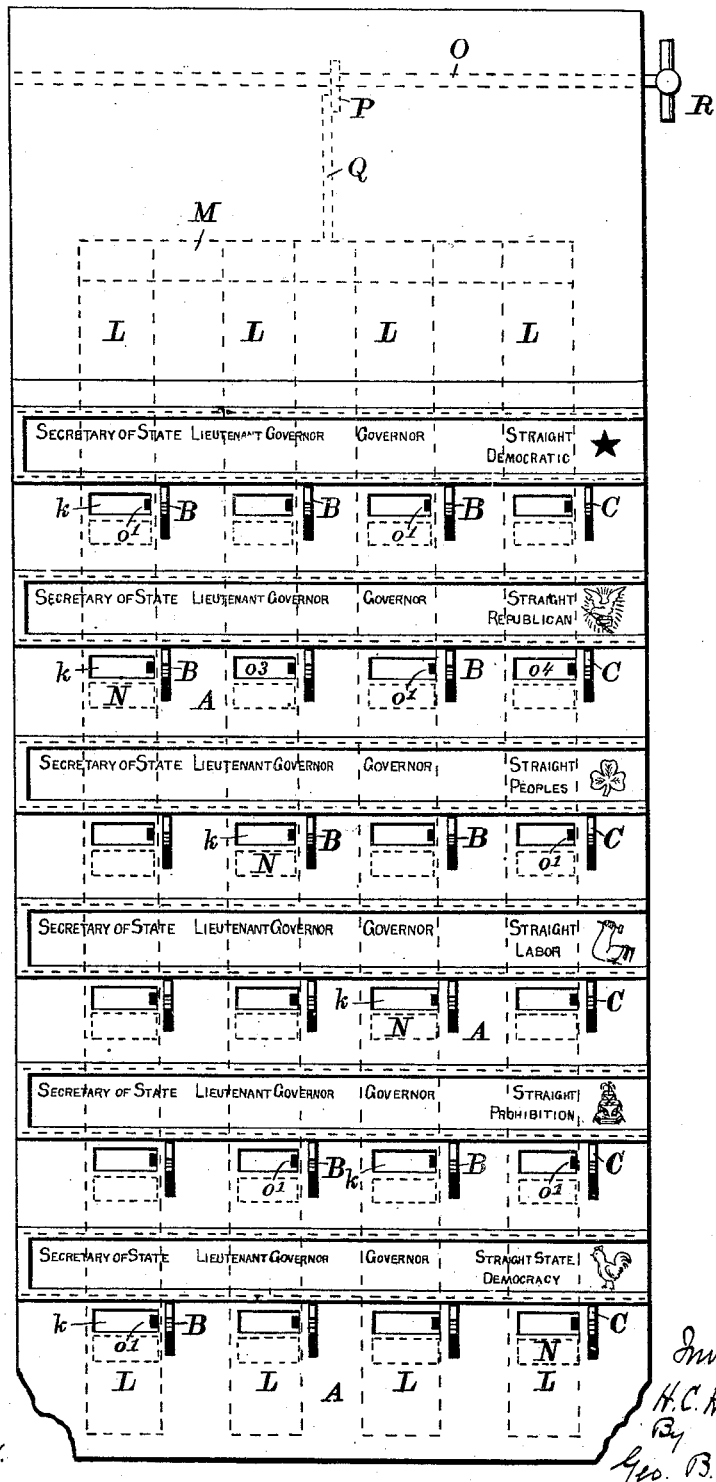
Figure 12:
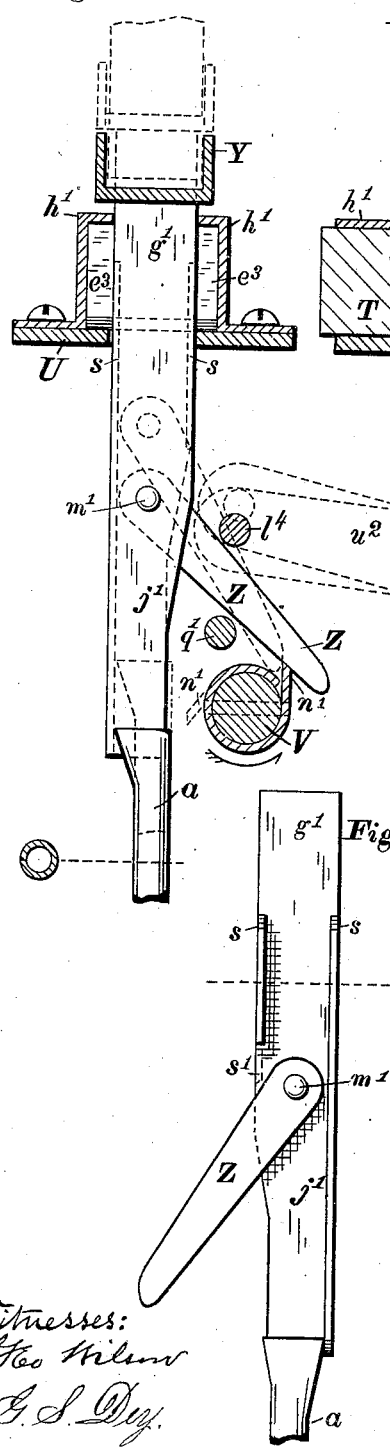
Figure 13:
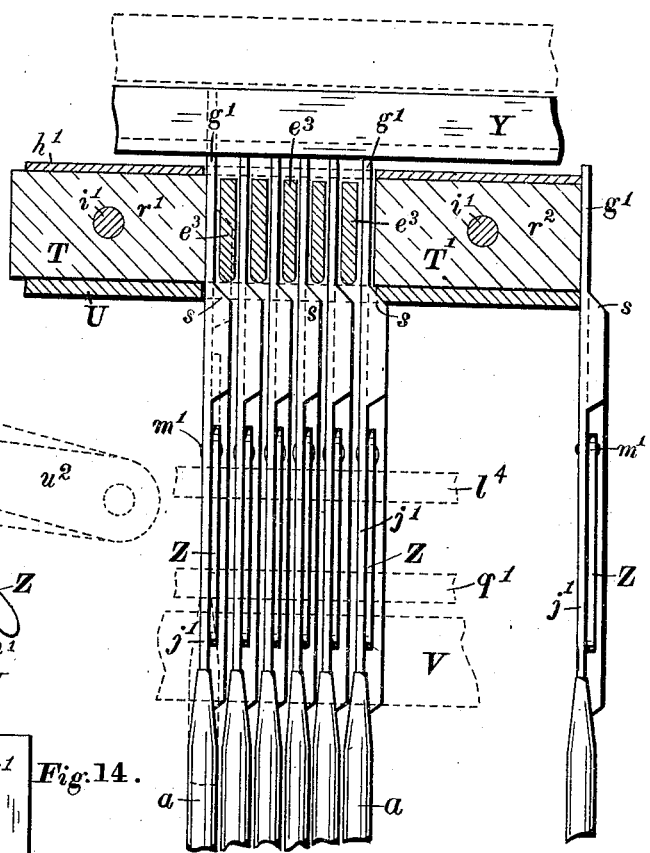
Figure 14:
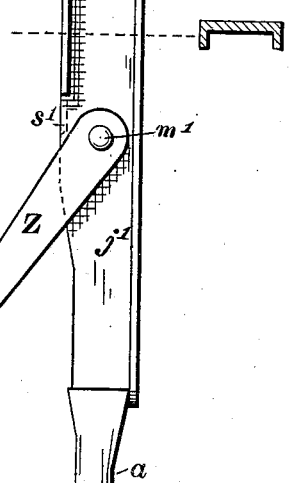

In the accompanying drawings representing my improvements, Figure 1 is a front elevation of the key-plate of a voting machine arranged for six parties and for candidates for three different offices, embodying my improvements. Fig. 2 is a rear elevation of the same,—the door being open. Fig. 3 is a front elevation of one of the counter-sections detached. Fig. 4 is a side view of my improved voting machine, as seen from the left in Fig. 2,—the casing next the observer being removed. Fig. 5 is a front view of the shutter, by which the counters are covered until the close of an election. Fig. 6 is a rear elevation of one of the counters. Fig. 7 is a side-view of the palleted lever the toothed wheel and circular plate of one of the counters. Fig. 8 is a side-view of one of the palleted yokes and the disk which operates it. Fig. 9 is a central vertical section on the line 9—9 Fig. 8. Fig. 10 is a side view of one of the counters, as seen from the right hand in Fig. 6. Fig. 11 represents the units-disk detached. Fig. 12 is a side view of the upper part of one of the interlocking rods, showing the channel for the interlocking-blocks in section. Fig. 13 is a longitudinal section of the interlocking mechanism. Fig. 14 represents the upper end of one of the interlocking rods as seen from the side opposite to that shown in Fig. 12. Fig. 15 represents the lower part of the key-plate with my improved irregular voting mechanism. Fig. 16 is a rear elevation of my improved irregular voting mechanism. Fig. 17 is a side view of the same, partially in section, showing the connection with the interlocking rod. Fig. 18 is a side view of the irregular balloting mechanism showing the connection with the interlocking mechanism. Fig. 19 is a side view of the same, showing the mechanism for delivering the ballot-holder into the ballot-receptacle. Fig. 20 represents the cam on the door or turnstile.

In the accompanying drawings, A is the key-plate, which is arranged in the vertical position in the voting compartment, as is usual in this class of machines.

B are the keys for selective voting, and C the keys for straight-ticket voting. Each key is provided with a counter, and interlocking mechanism is employed between the different counters, and also between the selective mechanism and the straight-ticket counters. In the arrangement shown, the keys corresponding to the different candidates for the same office are placed in vertical lines,—the keys for all the candidates for any particular political party occupying the horizontal rows. The voting-booth is provided with any suitable entrance and exit doors, and suitable connections are arranged so that a voter on leaving the booth resets the apparatus into the normal position, ready for the next voter. The booth is not shown in the accompanying drawings, but it will be be understood that such part of the machine is arranged in any suitable or preferred way.

The construction of that portion of my improvements herein described differs from that shown in the said Davis patent principally in that,—the count in my machine is taken off from the front side of the key-plate. I also provide a device by which the voter is enabled to see that the counter moves when he votes, although he cannot observe the number of votes registered on the units-wheel of the counter.

The voting apparatus is provided at the back with a door, D, Fig. 2, but this is only used to inspect the machinery and to set the counters, and it may be locked and sealed during the whole of an election, including the counting of the votes cast. The key-plate A is provided with apertures opposite the counters, which apertures are closed by a suitable shutter or shutters while the election is in progress, but which are opened when the voting is over, so as to permit the proper election officials to inspect the counters from the front of the plate and to count the votes cast for the different candidates, and to announce the result. By taking off the vote from the front of the key-plate I dispense with one set of ballots or ballot-captions, since two such sets must be used when the vote is examined from the rear,—one in front and one on the back,—and thereby either reduce the amount of printing or dispense with it entirely, and prevent errors which might arise, through accident or design, from misplaced name-cards, or other causes. In my construction the figures on the counter are displayed at the close of the election, in immediate proximity to the placard indicating the office and the name of the candidate. My improved voting-machine differs in other respects from those described in the said patent of Davis, and in the Davis patents of Nov. 12, and Nov. 19, 1895, as will be pointed out later. Provision may be made for irregular-balloting in any suitable way,—such for instance as that shown in the said Davis patents, or as described hereinafter.

The key-plate is provided with a series of movable parts or keys, which may be either pushes or pulls, or, as shown in the accompanying drawings, levers B, C, Fig. 1, which may be moved downward by the voter to operate the corresponding counters.

The voting apparatus is inclosed within a suitable supporting frame, or box, G, which sustains the parts and protects them from injury or interference. The key-plate forms the front of the box or inclosure, and the door D the back or rear side. The keys project through slots in the plate,—being provided, if desired, (see C Fig. 17,) with curved wings inside the plate to keep the slots closed in all positions of the keys. In the construction shown in Fig. 17, one of these wings works inside the key-plate, and the other, which is on the lower edge of the key, travels down outside the plate,—the edges of these wings being curved on a circle from the center $h$.

The counters in each vertical line are supported in a removable channel or section, F, to which the keys B are also pivoted. The channel F is shaped like a trough, with its open side behind,—the front side which corresponds to the bottom of the trough being provided with apertures $k^1$ through which the counters are read off, and the two sides being perforated to support the pins or studs which carry the counters and their operating parts. The channeled sections facilitate the construction and assembling of the machine, since all the counters and their connected parts for any one vertical line may be put together on the bench and the channel then placed in the machine as a whole, ready for use,—it only being necessary to connect the interlocking rods $a$ to the levers J. The removal or replacement of the counter channels or sections is made from the front of the machine,—the key-plate A when put on serving to hold the sections in place.

The base $b$ of the machine is provided with a series of lugs or projections $e^1$, of a size corresponding with the width of the channels between the sides, which lugs serve to secure the channels in place when the latter are inserted on them. A corresponding series of lugs, $b^1$, on the transverse plate $c$, serves to secure the upper ends of the channels, which are slipped onto the lugs from the front of the apparatus,—the key plate A when attached holding the channels in place on the lugs. In this way provision is made for easily inserting or removing the channels, with their counters and keys.

The method of actuating the counters will be understood from Figs. 6 to 11 inclusive. Each of the counters consists of three numbered disks, I, $I^1$, $I^2$,—of which I is the units-disk, $I^1$ the tens-disk, and $I^2$ the hundreds-disk. The disks consist of a circular plate $d$, having a flange $e$ turned or drawn on it,—the flange being marked with the figures 0 to 9 in any suitable way. The counter-disks are supported so as to revolve freely on a stud $o$ secured in the side-walls of the channels F in any suitable way. Each of the counter disks is provided with a toothed or star-wheel, $f$, which is secured to the disk by the rivets $g$.

J is the palleted lever which actuates the units-disk, and $J^1$, $J^2$, the palleted yokes which actuate the tens and hundreds-disks respectively.

The lever and yokes are pivoted so as to turn freely on the stud $h$ secured in the side walls of the channel in any suitable way. The key B is also pivoted on the stud $h$, which on one side extends beyond the side-walls of the channel. The key B is provided with a projecting lip $i$ at its lower end, which reaches under the lever J and causes the latter to swing on its pivot, when the outer end of the key is depressed. The lever J is made of such a shape, as shown, that when it swings, the inclined pallets $l$ $l^1$, Fig. 7, with which it is provided, engage with the teeth of the star-wheel $f$, and impart to it a step-by-step movement, of one twentieth of a revolution at each step. When the voter fully depresses the outer end of the key B, the lever J is raised, the pallet $l^1$ swings inward and engages with one of the teeth of the wheel $f$. When the voter leaves the booth, the lever J is returned to the normal position, and this motion engages the pallet $l$ between two of the teeth of the wheel $f$, and imparts to it the second step necessary to bring the next figure into proper position relative to the aperture $k^1$ in the front of the channel F, through which the indications of the counter are visible. It will be observed that one or the other of the pallets $l$ $l^1$ are all the time engaged with the teeth of the star-wheel $f$, and that thus any accidental movement of the numbered disk is prevented. It will also be understood that, since the counting movement of the disk is not completed until the voter leaves the booth, it is impossible to repeat a vote, or otherwise tamper with the counter. At its rear end the lever J is provided with a stud $m$, to which the interlocking rods $a$ are pivoted. These studs $m$ are made of different lengths, the shortest being on the lever of the upper counter, in the construction shown, as indicated in the rear view, Fig. 2, so that the interlocking-rods, $a$ are straight and parallel with each other,—each lower stud $m$ being enough longer than the one next above it, to allow its interlocking rod to pass by the rod attached to such higher stud. The lever J also carries a stud $n$, which produces the return movement of the yokes $J^1$ $J^2$, when the apparatus is reset to normal position. These studs $n$ are all of the same length, extending over both of the yokes.

When the units-disk I has made a complete revolution, it is necessary to shift the tens-disk $I^1$ a tenth of a revolution. This is accomplished by a swinging movement of the palleted yoke $J^1$, which is moved in one direction by the units-disk I and in the opposite direction by the stud $n$ on the lever J. The pallets $l^2$ $l^3$ of the yoke $J^1$ act on the teeth of the star-wheel $f^1$, which is attached to the tens-disk $I^1$. The pallet $l^2$ of the yoke $J^1$ is provided with a pin, $p$, which projects into the open space inside the flange $e$ of the units-disk, I, and at the proper time encounters the inclined flange $q$, by which the pin $p$ is forced outward,—this movement disengaging the pallet $l^2$ from the star-wheel, and engaging the pallet $l^3$ with it on the opposite side, thereby imparting one-twentieth of a revolution to the wheel $f^1$ and the tens-disk $I^1$. The flange $q$ is so placed on the units disk, relatively to the figures on the flange, that it encounters the pin $p$ at the time the units counter, as viewed through the aperture $k$, is changing from 9 to 0,—at which time the tens-disk should change from 0 to 1. The flange $q$ is attached to the units disk in any suitable way, such as the rivets $g$ which fasten the star wheel to the disk.

In Fig. 11, a plate is indicated by the dotted lines $t$, which may be secured to the units-disk by the rivets $g$,—the flange $q$ being bent up from such plate. A circular flange, $u$, Fig. 11, may also be employed, of a diameter sufficient to pass just outside the pin $p$, which operates to prevent any accidental movement of the yoke $J^1$ when the lever J is raised. In this case the flange $u$ should be cut away just in front of and behind the flange $q$, to permit the movement of the pin, and the two flanges may be formed in one piece and secured to the disk by the rivets $g$ as before described. The flange $u$ may be bent outward, as indicated by the dotted lines $u^1$, Fig. 11, so as to insure the engagement of the pin $p$ inside of it. The yoke $J^1$ is pivoted so as to swing freely on the stud $h$, and it is extended upward between the disks, as indicated at $v$, to prevent the disks from coming in contact with each other. The return movement of the yoke $J^1$, which completes the counting movement of the tens-disk, is secured by the downward motion of the lever J, acting through the stud $n$ on the upper edge of the arm $w$ on the yoke.

The method of imparting one-tenth of a revolution to the hundreds-disk $I^2$, when the tens-disk $I^1$ has made a complete revolution, is similar to that already described for operating the tens-disk from the units-disk. The tens-disk $I^1$ is provided with a flange like $q$, and the yoke $J^2$ is provided with a pin corresponding to pin $p$. The operation of the parts is exactly similar to that already described. The yokes $J^1$ and $J^2$ are interchangeable with each other, and so also are the disks $I^1$ and $I^2$, except that the latter, in case only three counters are used, counting up to 999, need not be provided with the flange $q$.

The setting of the counters at zero is easily accomplished. The door D being open, the election official sees that the units disk shows the figure 8 through the opening $k$ raises the lever J, and then, by working the arms $w$ of the yokes $J^1$ $J^2$, rotates the disks $I^1$ $I^2$, until the figures 9 on them show through the aperture $k$. This occurs when the figures 4 on the disks are visible from the back, on a level with the stud $o$. Either of the disks may be so set before the other. The up and down movement of the lever J also sets the units-disk at 9, and then a single movement of the key B and resetting bar Y changes all the disks from 999 to 000,— in which position the machine is in condition to begin an election. When the circular flange $u$ is employed, the setting can only be done when the units and tens-disks are in such position that the pin $p$ can pass through the opening between the flange $q$ and the ends of the flange $u$,—preferably through the space $x$ between $q$ and the front end of the flange $u$. The disks will then show between 4 and 5 on the horizontal line from the back.

It is desirable to give a voter a visible indication of the operation of the voting apparatus, so that he may know that he has voted. This I accomplish by allowing a portion of the units disk, or the edge of a plate revolving therewith, to be seen through an opening in the key-plate, and by so marking or coloring the surface so visible that a change of the marking or coloring may be observed by the voter, every time the units disk moves. For instance, an opening, being made through the key-plate opposite the row of characters, $y$, Fig. 6, on the units-disk I, the change from one character to another will be visible to the voter. The characters may be alternately $o$ and $x$ or a cross, and then when a person votes, the $o$ will change to $x$ or a cross in a visible manner. Any other suitable characters may be employed, or the spaces may be of different colors, say red and white, and then the visible portion of the disk would change from red to white, or vice versa, at each voting operation. A circular plate, $p^1$, Figs. 6 and 7, may be attached to the units disk on the outer side of the star-wheel, and the edge of this disk, suitably marked or colored, may be displayed through an opening in the key-plate. This plate $p^1$ also serves as a guide for the lever J. In any arrangement, provision should be made for preventing the voter from seeing any of the figures on the counter-disks, either by bringing the units disk or the edge of the plate $p^1$ close against the key-plate, or by extending flanges backward from the edges of the aperture in the key-plate.

The arrangement of the shutter, by which the figures on the counters are covered during the progress of an election, will be understood from Figs. 1, 4 and 5. In the construction shown, the shutter consists of a number of strips of sheet-metal, L,—one for each channeled section,—and all being attached to the cross-bar M so that they may be shifted simultaneously. Each of the strips is provided with a series of apertures, N, Figs. 1 and 5, which correspond with the apertures $k$ through the key-plate A. The strips L are arranged in front of the section and normally, while an election is being held, with the openings N out of register with the openings $k$. In this position, the counters are protected from view by the shutter, but at the close of the polls, the shutter is shifted by any suitable means, so that the openings N come opposite the holes $k$, when the indications on the counters are exposed. It will be observed that the openings $k^1$ in the front-wall of the channeled sections come opposite the openings $k$ in the key-plate. The strips L slide between the front of the section and the key-plate, being guided in any suitable way, if necessary. The shaft O, crank P and connection Q, form a convenient way of shifting the shutter, so as to cover or uncover the figures on the counters. This shaft extends across the machine, being supported in suitable bearings, and provided with the crank P which is connected with the cross-bar M by the link Q. The shaft O is provided at one side of the machine with the handle R, and it may be arranged so as to be locked in either or both positions of the shutter, or other devices may be employed to hold the shutter in the open or closed position. A lock, S, Fig. 4, the bolt of which engages with a pin or pins or in a notched plate attached to the shaft O answers this purpose effectively,—the keys being held by the election officials until the close of the polls.

In case the movement of the counter be made visible, an additional opening, $o^1$, Figs. 1 and 5, is made through the shutter, in such position as to display the row of characters, $y$, Fig. 6, on the units-disk, or the row of characters or parti-colored spaces on the edge of the circular plate $p^1$, while the figures on the counters are covered. These openings $o^1$ register with the openings $k$ in the key-plate, so that the characters or colors are visible through them. It will however be understood that the device for rendering the movement of the counter visible may be employed on voting-machines which are read from the back, and are not provided with shutters,—in which case the apertures $o^1$ would be made in the key-plate, and in the front of the channeled section. It will also be understood that the shutter may be made in one piece, and that various different devices for shifting and locking it may be adopted.

The construction and operation of the interlocking mechanism will be understood from Figs. 2, 4, 12, 13 and 14. Each of the levers J is pivoted to an interlocking-rod, $a$, and these interlocking-rods are provided near their upper ends with the thickened or wedge-like portions $s$, which when one of the rods is raised by the operation of its key, force the interlocking-blocks $e^3$, Fig. 13, apart, so that they fill the whole space between the abutments T T$^1$, and thus prevent the raising of any other rod and the actuation of any other key in the same vertical line. The blocks $e^3$, are slightly movable laterally in their supports, and the rods $a$ are permitted also the requisite amount of lateral movement. The upper parts $q^1$ of the interlocking rods and the blocks are made of such thicknesses, that, when one of the wedges $s$ is thrust in between them, the rods at each side of the series bear against the abutments T T$^1$, and none of the other wedges can be inserted, so that the voter finds it impossible to vote for more than one of the candidates for any particular office. The lower ends of the interlocking blocks are preferably rounded or beveled. The bar U extends across the machine, being sustained in any suitable manner, and supports the blocks and the abutments. The blocks are made somewhat wider than the upper portions of the interlocking-rods, as indicated in Fig. 12,—so that they rest at their lower corners on the bar U,—which is perforated to allow the rods to pass through it. The channel $h^1$ serves to hold the blocks in place on the bar U,—being provided with flanges which are fastened to the bar. The abutments are prevented from moving lengthwise in the channel, by the bolts, screws or pins, $i^1$, which pass through the vertical sides of the channel. These pins or screws are made removable, for the purpose of adapting the machine to multicandidate or group voting, as hereinafter described. The interlocking-rods $a$ may be hollow, being formed by drawing a metallic strip of suitable width through a die, and having their lower ends flattened and perforated, for attachment to the studs $m$ of the levers J. At their upper ends, the tubular rods are brazed or otherwise secured to the strip $j^1$, which has its edges turned over to form the wedge or wedges $s$, and to which the trips Z are pivoted, at $m^1$, Figs. 12 and 14. At their upper ends, the strips $j^1$ form the thin portions $g^1$ which are located between the interlocking blocks $e^3$, and by which the interlocking-rods are held in line and in proper engagement with the interlocking blocks. In the particular construction shown, the strips $j^1$ are secured to the tubular rods by having their lower ends inserted and brazed in the longitudinal joint of the hollow rods.

When one of the interlocking rods is raised by the actuation of its corresponding key and counter, the catch or dog Z engages with the trip-shaft V, and holds the rod elevated until the apparatus is restored to normal condition by the voter while passing out of the booth. The key will not remain depressed or the rod elevated, until the dog has engaged with the trip-shaft, so that the voter knows that he has not properly operated the counter, until the key stays down,—the weight of the interlocking rods and attached parts serving to return the key from any position to which it may have been moved, until the dog is actually engaged with the trip-shaft. The shaft V is provided with a projecting lip $n^1$, with which the point of the dog Z, engages, as indicated by the dotted lines in Fig. 12. A partial downward movement of the key will engage the dog with the lip, and the rolling motion of the trip-shaft will then raise the rod further and produce the first step of the movement of the units disk. A stationary rod $q^1$, extending across the machine between the dogs and the interlocking-rods prevents the dogs from moving too far, and another movable rod or bar $l^4$ rests on the upper or rear side of the dogs. This rod $l^4$ is hung on arms $u^3$ pivoted to the frame of the machine and serves to prevent any unnecessary movement of the dog, which may also be accomplished by carrying the flange $s$ down, as indicated at $s^1$, Fig. 14, so that it will arrest the movement of the dog at its farthest point. The dog is tripped and the rod raised and released by the partial rotation of the trip-shaft V in the direction indicated by the arrow in Fig. 12, the lip moving toward the rod by the movement of the door or turnstile as the voter passes out of the voting-compartment. Any suitable means of securing this result may be adopted, but in the arrangement shown, the shaft or pintle W, Fig. 4, of the door or turnstile is provided with a cam or crank $x^1$, which, through the connection $y^1$ and crank $z^1$, imparts a partial rotation to the rock-shaft X, which, by crank $a^2$, connection $b^2$ and crank $c^2$, transmits the requisite movement to the trip shaft V. The rock-shaft X extends across the machine, being supported in any suitable journals. The cranks $a^2$ $c^2$ and connection $b^2$ may be located at one end of the machine, and either inside or outside the casing. It is needless to remark that any connections or moving parts outside the case should be protected so that they cannot be interfered with. As the trip-shaft V turns, the lip $n^1$ raises the dog and rod, and, passing underneath the point of the dog, allows it to escape from its engagement, so that the rod and dog may resume their normal position, as indicated by the full lines in Fig. 12. This up and down movement is transmitted to the units-disk. Provision is made for restoring the parts to their normal position by the movable bar Y, which extends along over the interlocking rods, and may rest thereon. When one of the interlocking rods is raised, the bar Y is elevated, (see full and dotted lines Figs. 2 and 13,) and it remains in that position until forced downward positively by the movement of the door or turnstile as the voter leaves the voting compartment. This movement is secured from the rock-shaft X, but, as it is necessary that the dog or dogs Z should be unlocked before the rod or rods are depressed, the construction is such that the trip-shaft V is moved first. This is secured by the slots in the links $d^2$, Figs. 2 and 4, which permit the cranks $e^2$ to move a certain distance, (during which time the dogs are unlatched by the trip-shaft V,) before the bar Y is depressed, by the pins in the cranks $e^2$ arriving at the lower ends of the slots. The bar Y is then pressed downward, and, acting on the ends $g^1$ of the interlocking-rods, forces them back to their normal positions, completes the movement of the counters, and restores all parts of the machine to the position necessary for the next voting operation.

I provide for straight-ticket voting,— that is the case when a voter desires to vote for all the candidates of any one party, by arranging a row of keys, levers and counters, preferably at one side of the selective-voting-mechanism, so that the voter can indicate his political preference by a single movement, thereby reducing the time occupied in voting and increasing the capacity of the machine. Suitable interlocking mechanism is employed between the straight-ticket and the selective-voting mechanism, so that, a voter, having actuated the straight ticket counter of any political party, he cannot thereafter vote for any of the candidates either of his own or any other party. In this case, in order to ascertain the total vote, it will be necessary at the close of the election, to add the number shown on the straight-ticket counter to the number indicated by the counter devoted to any particular candidate of the same party,—the sum of these numbers giving the whole vote cast for such candidate. Thus, suppose it be required to find the vote for the Republican candidate for lieutenant governor, the number of the counter at $o^3$, Fig. 1, is added to the number on the counter at $o^4$,—and the sum of these numbers represents the whole vote for this candidate. In a similar manner, the vote for any other candidate is determined.

The keys for actuating the straight-ticket counters are represented at C in the accompanying drawings,—the counters being of the same construction as those already described, mounted in a removable section F, and provided with interlocking-rods, locking dogs and interlocking-blocks in a manner similar to that previously set forth. The interlocking with the selective-voting counters is provided for by attaching a wedge or interlocking rod $w^1$, Fig. 2, to the bar Y and arranging such wedge in relation with the interlocking blocks $e^3$ and their abutments of the straight-ticket counters, so that, when the bar Y is raised by one of the interlocking-rods of any of the selective-voting counters, none of the straight-ticket counters can be operated,—the space between the abutments being fully occupied, so that none of the rods of the straight-ticket counters can be raised. On the contrary, when one of the straight-ticket counters has been operated, the wedge $v^1$ cannot be inserted between the abutments, the bar Y cannot be raised, and consequently none of the selective-voting counters can be actuated. It will be seen that by this arrangement provision is made for positively interlocking the straight-ticket counters and the selective voting mechanism, so that no voter can operate both simultaneously. The wedge $v^1$ is provided with a thin shank which extends up through the bar U and is pivoted to the bar Y at $w^1$, Fig. 2. The bar Y is arranged to move up and down in suitable guides, or it may be swung by arms $c^3$ pivoted on a transverse shaft $a^3$, Figs. 2 and 4. In order to restore the straight-ticket counters to normal position, I use the pivoted plate K which is lifted up by any one of the interlocking rods, and is forced downward by the pin $f^2$ on the arm $g^2$ on the rock-shaft X, (see Fig. 4). The plate K extends over all the interlocking-rods of the straight ticket counters, and is provided with a flange $h^2$ which is pivoted to the frame, at $i^2$, and extends upward into the path of the pin $f^2$. It will be observed that, when the rock-shaft X moves, the trip-shaft V will be operated before the pin $f^2$ encounters the flange $h^2$. The trip-shaft, and its longitudinal flange or ledge $n^1$, are conveniently formed by bending a strip of suitable metal around a shaft, leaving the ledge to project, and by securing the parts together by pins or screws.

In order to provide for the irregular-vote,—that is for the votes which may be cast for persons not put in nomination by any of the political parties, I furnish the irregular voter with a box or ballot-holder, of any suitable or preferred form, and the voter, having placed his ballot, either written or printed, in the holder, inserts the latter in an opening in the key-plate, which operates the interlocking mechanism so that the voter cannot vote for any other candidate for the same office, and then, when the voter leaves the booth, the ballot-holder is delivered into the ballot-receptacle.

The ballot holder may be round or flat, and open at one end, or separable in any suitable way. In Fig. 15 of the accompanying drawings, I have represented the orifice $Q^1$ for the insertion of the ballot-holder as having the form of a truncated cone, and the holder $H^1$ of a corresponding form. Behind the key-plate is placed a suitable inverted trough or guide, $L^1$, which is provided at the bottom with the movable door or support for the holder $N^1$. The inclination of the sides of the guide outward, prevents the stuffing of it with paper or waste,—since anything which will not fall out of it when the door $N^1$ swings downward, will be ejected by the return movement of the plunger $P^1$. The door swings downward and opens the bottom of the guide, and returns to place before the plunger is moved. The guide is conveniently formed of sheet metal, being provided with suitable flanges by which it is attached either to the key-plate, or to the bed $R^1$, Figs. 17 and 18. Or the ballot holder-guide may be attached to the channeled sections already described, which sustain the counters of each vertical line. When the ballot-holder is inserted in the guide, the plunger P¹ is forced backward, as represented by the full and dotted lines in Fig. 18, and this movement is transferred to the interlocking rod $a^4$ by the bell-crank lever S¹. The irregular interlocking rod $a^4$ is provided at its upper end with the wedge and trip, the same as the interlocking rods already described, and it operates in the same way, to prevent voting for any regular candidate in the same vertical line,—the only difference being that in a machine arranged for handling the votes of six political parties, if the irregular voting mechanism is employed, there will be seven interlocking rods and their corresponding interlocking blocks and other parts. When the rod $a^4$ of the irregular voting device is thrust upward, its wedge fills the allotted space between the interlocking blocks, and none of the other interlocking rods of the same series can be operated, and consequently none of the counters in the same vertical line can be operated. It will also be observed that if one of the straight ticket counters is operated, the irregulars are then locked out, and vice versa. Consequently the simultaneous use of any of the straight-ticket-counters, and any of the irregulars, is prevented. Each of the irregular plungers P¹ is provided with a lever S¹ and an interlocking rod $a^4$. The levers S¹ are pivoted on a rod U¹ extending across the machine and supported at its ends, and intermediately, if required, by the brackets V¹ attached to the bed R¹. At one end the levers S¹ are pivoted to the corresponding interlocking-rods, and at the other, and to the arms T³ attached to the plunger P¹. Each plunger and its arm may be made in one piece, or connected together in any suitable way. The levers S¹ are each provided with a stud $m^2$, Fig. 17, which brings the interlocking rods $a^4$ outside of the rods $a$ of the selective-voting counters. The plunger may be arranged to slide in any suitable guides, and for this purpose its stem may be a straight rod, but I prefer to swing it on the link G¹, Figs. 17, and 18, which may be conveniently pivoted on the stud $h$ of the lowest counter, which is next above the irregular mechanism. The plunger and its stem being thus supported by the link G¹ and the long arm of the lever S¹, will travel in a course sufficiently straight for its purpose. When the restoring bar Y, Fig. 2, descends, the interlocking rods $a^4$ are forced downward, and the plungers P¹, if any have been used, are returned to the normal position, indicated by the full lines in Fig. 18. But before this occurs, as already described, the trip-bar is rocked, and the dogs Z are unlocked, and advantage is taken of this to open and close the doors N¹ at the bottom of the ballot-holder guides before the plunger is returned by the descent of the bar Y. This is accomplished by the slotted plate Z¹, which is actuated by connections with the door or turnstile, or with the rock-shaft X, and is arranged to act on the lever C¹ which is connected with the rock-shaft D¹ to which the doors N¹ are secured.

It will of course be understood that suitable openings are made in the bed R¹ to permit the doors N¹ to swing downward, as indicated in Figs. 18 and 19. In the particular arrangement shown, the rock-shaft X is provided with an arm F¹ and connection K¹, Fig. 17, which operates the sliding plate Z¹. This plate is arranged to slide in any suitable guides and it and its connected parts may be duplicated at each end of the machine. Its lower end may be guided by an opening in the bed R¹ while its upper end slides in any suitable ways on the side-frame of the machine. As the plate Z¹ descends, it actuates the lever C¹ by means of a double inclined slot so as to open and close the door at the bottom of the ballot-holder guide before the plunger is returned by the descent of the bar V. The slot in the plate is indicated at X¹, Figs. 17 and 19, and it acts on the pin $u^3$ on the lever C¹, which is connected with the rock-shaft D¹ by the link $v^2$ and the crank $z^2$. The slot X¹ has a double inclined portion, $t^2$, $t^3$, at its lower end, which acts on the pin $u^3$ on the lever C¹ to swing it first one way and then in the other, which motion is transmitted to the rock-shaft D¹ to open and close the door N¹ at the bottom of the guides for the ballot-holders. The lever C¹ swings on a pivot, $j^2$, carried by the side-frame of the machine, or, as in the construction shown, by the standard O¹ fastened to the bed R¹. In this arrangement the bracket O¹ is provided with a slot, $d^3$, Fig. 19, to permit the movement of the pin $u^3$. As the rock-shaft X turns and the slotted plate Z¹ descends, the first action of the slotted plate is to open and close the door N¹, after which the straight part of the slot X¹ holds the door closed during the remaining portion of its travel. The door is opened and closed when the voter enters the booth and the plate Z¹ is raised, but this movement has no effect on the voting, either straight-ticket, selective or irregular. The interior of the ballot-holder guide, is given a form corresponding with that of the opening Q¹ in the key-plate, and the upper part of the ballot-holder guide L¹ is slotted to permit the movement of the arm G¹. The return of the door N¹ before the plunger P¹ moves, insures the ejection of any article or substance which may have been maliciously inserted in the guide L¹. When the irregular device is applied to the channeled section, the front of the section is provided with an opening corresponding in shape with Q¹ in the key-plate.

Below the doors N¹ the machine is provided with suitable chutes by which the ballot-holders are guided during their delivery into the ballot-receptacles at the base of the machine,—which receptacles are kept locked during the election, to be opened at its close to allow the election-inspectors to ascertain the scattering or irregular vote, by counting the ballots in the ballot-holders. In case of any irregularity in any of the irregular votes,—such as two names on the same ballot, such vote will be rejected.

It will of course be understood that my improved voting machine will be provided with as many sections or lines of counters, (with irregulars, if desired) as there are offices to be filled at any election at which the machine is to be used. In order to adapt the machine to multicandidate voting,—that is, where each party has the right to nominate two or more candidates for the same office, one or more of the pins $i^1$ between the abutments T T¹ T² are removed,—so as to allow lateral movement in the channel $h^1$ to the abutment which is normally held in place by the pin.

Suppose it is required that the machine be adapted to a multicandidate group of two,—that is, two candidates for coroner, say, are nominated by the same political party,—then the pin $i^1$ in the abutment T², Fig. 2, is removed, and this abutment is thus allowed a certain amount of lateral movement. Under this arrangement, any two of the interlocking rods in the right hand section of Fig. 2, can be thrust upward, or any two in the next adjacent section, or any one in one of the sections, or any one in the other, but after two such rods have been operated, no others in either of the sections can be thrust upward. The voter therefore can vote for any two candidates out of the twelve, and he cannot vote for more than two. He can also use either or both irregulars, which are interlocked in the group. It will be obvious that by removing two or more of the pins $i^1$ the system may be extended to multicandidate groups where three or more candidates are proposed by the same party for the same office.

In Fig. 20 I have shown a cam of a form which I have employed in connection with a turnstile to secure the proper motion of the connection $y^1$ and rock-shaft X. It will be understood that the rock-shaft may be operated by any suitable mechanism from the door or turnstile of the voting compartment.

It will be obvious to the skilled constructor that many alterations or changes from the inventions herein described may be made, without departure from the fundamental principles thereof. Thus any suitable form of counter or registering device may be used and it may be rendered visible for the purpose of taking the count from the same side of the key-plate on which the voting is done, and any such suitable counter may be provided with a marked or particolored portion which is visible to the voter to show that the mechanism operates at the time he votes. The straight-ticket counters may be of a construction different from the selective-voting counters, and they may be arranged horizontally instead of vertically. The arrangement of the connections between the inlet or outlet doors and the restoring mechanism may be of any preferred kind. The interlocking mechanism may be variously modified. The keys and operating levers may be made in one piece. Some of the improvements herein described may be employed in connection with a voting machine which reads from the back or rear. The studs $m$ may be dispensed with,—the levers being bent to properly connect with the interlocking-rods. Any suitable locking devices may be employed on the interlocking rods, and any suitable tripping mechanism. Rollers may be employed for the interlocking blocks. The relative dimensions of the star-wheels, counters, levers and yokes may be varied. The counter-disks may be placed on separate axes, instead of upon one as shown. Any suitable mechanism may be employed for closing the doors of the irregular before the plunger returns. And the resetting or restoring mechanism may be of any suitable arrangement or construction.

It will be understood that, instead of using the shaft U¹, the lever S¹ of the irregular plunger may be pivoted on a suitable stud carried by an arm or arms $n^2$, Fig. 18, attached to the section F. In this case the irregular device can be inserted in the machine along with the channel, it being only necessary to connect the interlocking rod $a^4$. The guide L¹ is attched to the section in any suitable way,—as by the flanges $x^2$, Fig. 18. As the guide L¹ is not as wide as the channel F the opening for the door N¹ is formed through the lug $e^1$ at the lower end of the section. The parts of this lug then project between the guide and the inside of the section, so as to secure the latter in place.

I claim.

1. The combination, in a voting machine, of the movable apertured key-plate, the upper and lower transverse plates having lugs thereon, the U-shaped channel section adapted to fit on the lugs, the counters supported in the channel, suitable counter actuating mechanisms, and the shutter provided with apertures adapted to register with the apertures in the key-plate.

2. The combination, in a voting machine, of the removable key-plate provided with sight and key apertures, the upper and lower transverse plates having lugs thereon, the channeled section adapted to fit on the lugs, the counters supported in the channel, the counter levers pivoted on the channel and projecting through the key-plate, and the shutter provided with apertures adapted to register with the sight openings on the plate and in the channel.

3. The combination with the key-plate A of a voting machine, provided with openings k, of the counter and its actuating mechanism, and the shutter L provided with openings N and o'.

4. The combination with the key-plate of a voting machine, of a series of counters representing candidates for the same office, each counter having a differentially-marked surface moving with the units-wheel, a corresponding series of inspection apertures through the key-plate, a movable shutter covering all the counters, and provided with apertures through which the voter can observe the movement of the differentially marked surface while voting, and other apertures which by the movement of the shutter display all the counters after the close of the election, suitable counter actuating mechanism, and suitable interlocking mechanism between the counters.

5. The combination with the apertured key-plate of a voting machine, of a series of counters having a differentially-marked surface moving with the units-wheel, a movable apertured shutter arranged normally to conceal the counts on the counters, but adapted to display the moving surfaces to the voter during the voting operation and to uncover the counters at the end of the election, suitable counter actuating mechanism, and suitable interlocking mechanism between the counters.

6. The combination with the apertured key-plate of a voting machine, of a counter having a differentially-marked surface moving with the units-wheel, a shutter provided with two openings, one of which displays such surface to the voter through the apertures in the key-plate while the numbers of the units-wheel are concealed, and the other permits the inspection of all the figures on the counter at the close of the election, and suitable counter actuating mechanism.

7. The combination with the apertured key-plate of a voting machine, of the counter having a differentially-marked surface moving with the units-wheel visible to the voter, the movable shutter arranged to normally obscure the indications of the counter, but provided with an opening through which the movement of the units-wheel may be perceived by the voter.

8. The combination with the apertured key-plate A of a voting machine, of the counters arranged opposite the openings, suitable counter actuating mechanism, the shutter L having openings N which permits the inspection of the counters from the front of the key-plate, and openings o' through which the successive movements of the units-wheel of the counters are perceptible to the voter.

9. In a voting machine, the ballot registering counter having a differentially marked surface arranged to permit the inspection after the election of its indications from the front or voting side of the key-plate, suitable counter actuating mechanism, means for concealing the counter from view during the progress of an election, and means for permitting the voter to observe the movement of a differentially-marked surface moving with the units-wheel at each voting operation.

10. The combination of voting mechanisms and interlocking means therefor with the ballot-holder guide, of the plunger arranged to reciprocate therein, and the movable guide at the bottom of the guide arranged to open and close the ballot holder guide before the return of the plunger.

11. The combination of voting mechanisms and interlocking means therefor with the ballot-holder guide, of the plunger arranged to reciprocate therein, the movable door at the bottom of the guide, the slotted reciprocating plate Z' and suitable operating connections between said plates and door.

12. The combination with one or more of the counters of the selective voting mechanism of a voting machine, and suitable operating and interlocking mechanisms, of an irregular voting device comprising a ballot-holder guide, a reciprocating plunger therein connected with the interlocking mechanism, a movable door for the guide, and suitable mechanism for opening and closing said door before the return of the plunger.

13. In a voting machine, the combination with voting mechanisms arranged in a row of a removable U-shaped channel section for each row.

HENRY C. H. COOPER.

Witnesses:
J. W. HINE,
ANGUS MCKENZIE.

Copies of this patent may be obtained for five cents each, by addressing the "Commissioner of Patents, Washington, D. C."